US00RE34906E

United States Patent [19]

Tamaki et al.

[11] E Patent Number: Re. 34,906

[45] Reissued Date of Patent: Apr. 18, 1995

[54] MOTOR-DRIVEN THROTTLE VALVE ASSEMBLY

[75] Inventors: Sigeo Tamaki; Isamu Ishizawa, both of Katsuka, Japan

[73] Assignee: Hitachi, Ltd., Tokyo, Japan

[21] Appl. No.: 929,517

[22] Filed: Aug. 14, 1992

Related U.S. Patent Documents

Reissue of:

[64] Patent No.: 4,809,659
Issued: Mar. 7, 1989
Appl. No.: 56,653
Filed: Jun. 2, 1987

U.S. Applications:

[63] Continuation of Ser. No. 559,060, Jul. 30, 1990, abandoned.

[30] Foreign Application Priority Data

Jun. 2, 1986 [JP] Japan ..... 61-125756

[51] Int. Cl.[6] ..... F02D 9/08

[52] U.S. Cl. ..... 123/399; 251/129.12

[58] Field of Search ..... 123/339, 361, 399; 251/129.12

[56] References Cited

U.S. PATENT DOCUMENTS

| | | | |
|---|---|---|---|
| 4,367,805 | 1/1983 | Totani et al. | 123/361 |
| 4,424,781 | 1/1984 | Speer et al. | 123/342 |
| 4,455,978 | 6/1984 | Atago et al. | 123/361 |
| 4,519,360 | 5/1985 | Murakami | 123/399 |
| 4,519,361 | 5/1985 | Murakami | 123/399 |
| 4,569,321 | 2/1986 | Bonfiglioli et al. | 123/339 |
| 4,622,936 | 11/1986 | Junginer et al. | 123/399 |

FOREIGN PATENT DOCUMENTS

| | | | |
|---|---|---|---|
| 0112150 | 6/1984 | European Pat. Off. | 123/399 |
| 3146652 | 6/1983 | Germany | 123/399 |
| 50-38773 | 12/1975 | Japan . | |
| 58-25853 | 5/1983 | Japan . | |
| 59-25053 | 2/1984 | Japan | 123/361 |
| 60-79126 | 5/1985 | Japan . | |
| 60-183241 | 12/1985 | Japan . | |
| 61-72838A | 4/1986 | Japan . | |

OTHER PUBLICATIONS

Motorcycle Repair Manual by Bob Greene, Petersen Publishing Co., 1972, p. 183.

*Primary Examiner*—Andrew M. Dolinar
*Attorney, Agent, or Firm*—Antonelli, Terry, Stout & Kraus

[57] ABSTRACT

This invention relates to a motor-driven throttle valve assembly which drives a motor according to the amount of depression of the accelerator pedal (9) and thereby controls the opening of the throttle valve (2). The motor-driven throttle valve assembly of this invention has a restricting plate (14), which is located between the throttle valve shaft bearing (16) on the motor side and a gear mechanism (10) transmitting the rotation of the motor to the throttle valve shaft (3), controls the rotation of the throttle valve shaft (3) toward the closed position.

37 Claims, 1 Drawing Sheet

MOTOR-DRIVEN THROTTLE VALVE ASSEMBLY

Matter enclosed in heavy brackets [ ] appears in the original patent but forms no part of this reissue specification; matter printed in italics indicates the additions made by reissue.

*This is a continuation of reissue application Ser. No. 559,060, filed Jul. 30, 1990, now abandoned, which was a reissue application of U.S. Pat. No. 4,809,659, issued Mar. 7, 1989.*

This invention relates to a throttle valve assembly used in internal combustion engines and more particularly to a motor-driven throttle valve assembly which controls the opening of the throttle valve according to the output of the motor.

A conventional apparatus of the above type is disclosed, for instance, in the Japanese Application Publication No. 25853/1983 titled "Throttle Valve Control Apparatus for Internal combustion Engine" published on May 30, 1983. In this example, the torque of the motor is amplified by *a* gear and transmitted to the throttle valve.

The drawback of the conventional throttle valve assembly is that when the throttle valve is turned toward the closed position, the valve is thrown into the fully closed position with strong force and gets struck with the wall of the throttle valve intake air cylinder. The conventional practice to solve this problem requires setting the gap between the throttle valve and the wall of the throttle valve intake air cylinder to approximately 7 degrees. This, however, raises another problem that exhaust gas accumulates in that gap blocking the passage of air through it.

SUMMARY OF THE INVENTION

The object of the present invention is to provide a motor-driven throttle valve assembly which prevents the throttle valve at the fully closed position from getting struck with the internal wall surface of the throttle valve intake air cylinder and which prevents exhaust gas from accumulating in the gap between the throttle valve and the internal wall of the throttle valve intake air cylinder.

This invention is characterized by a stopper provided to the throttle valve shaft at a point between *a* bearing supporting the throttle valve and a gear mechanism restricting the rotation of *the* throttle valve toward the closed position.

According to the present invention, when the throttle valve is turned in the direction of the closed position, the rotation thereof is restricted slightly before reaching the fully closed position by the stopper, thereby preventing the throttle valve from getting seized with the wall surface of the throttle valve intake air cylinder. This structure also eliminates unnecessary twisting of the throttle valve shaft.

DETAILED DESCRIPTION OF THE PREFERRED EMBODIMENTS

Figure 1:
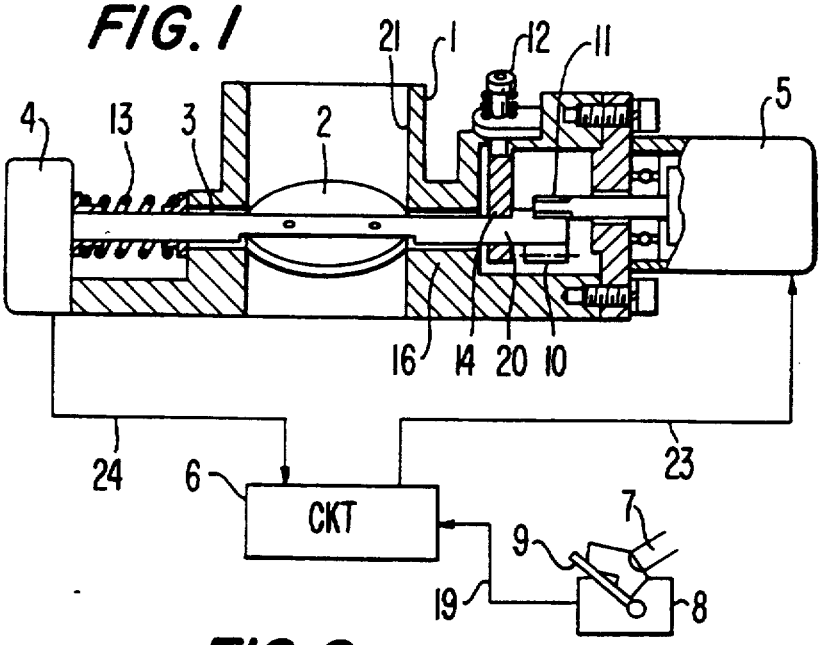
FIG. 1 is a partial cross sectional view of the throttle valve assembly of one embodiment according to the present invention, showing a stopper installed inside the throttle valve assembly to restrict the rotation of the throttle valve shaft toward the closed position.

Referring to FIG. 1, when a driver 7 depresses an accelerator pedal 9, an accelerator opening detector 8 senses the degree of pedal depression and sends a signal 19 to a control circuit 6. The control circuit 6, according to the signal 19 which is taken as the driver's intention, produces a signal 23 to the stepping motor 5 to start it. The rotation of the stepping motor 5 is transmitted to the throttle valve 3 in the throttle valve assembly 1 to control the movement of the throttle valve 2.

To check the operated position of the throttle valve 2, a throttle valve opening detector 4 is provided. The throttle valve opening detector 4 produces a failsafe signal 24 to the control circuit 6. The throttle valve 2 controlling the engine revolution speed is connected to and controlled by the output shaft 11 of the stepping motor 5 through the gear 10.

In general, the output axis 11 of the stepping motor is connected to the throttle valve shaft 3 through the gear 10. Since the throttle valve does not return to the idling state owing to the rotational force based on the force of inertia of the stepping motor, the return spring 13 is equipped to overcome the rotational force. The throttle valve is held by the restricting plate 14 fixed to the throttle valve shaft 3 playing the role of stopper and the adjusting screw 12 so that the throttle valve is able to hold the idling state by the return spring 13. When the car decelerates, the motor rotates the throttle valve shaft 3 toward the closed position with strong force owing to the force of inertia of the motor. When the car decelerates and the throttle valve is turned by *the* motor to a specified idle position, say, one degree before the fully closed position, the end 18 of the restricting member 14 abuts against the end 17 of the adjusting screw 12 attached to the housing 1 of the throttle valve assembly. Further, rotating of the throttle [vale] *valve* due to inertia is blocked thus preventing the valve from getting stuck with the inside wall of the intake air cylinder.

An important thing to be noted is that the restricting member 14 is located near the gear mechanism 10. If the restricting member is installed on the shaft on the other bearing side opposite to the motor, when the restricting member 14 abuts against the adjusting screw 12, a torsional stress develops in the throttle valve shaft 3, which may result in a break or bending of the throttle valve shaft or seizure of the throttle valve in the inside wall of the intake air cylinder.

With this invention, however, since the restricting member 14 is provided between the bearing 16 on the motor side and the gear mechanism 10, no torsional stress is produced in the throttle valve shaft 3 when the restricting member 14 strikes the adjusting screw 12.

Figure 3:
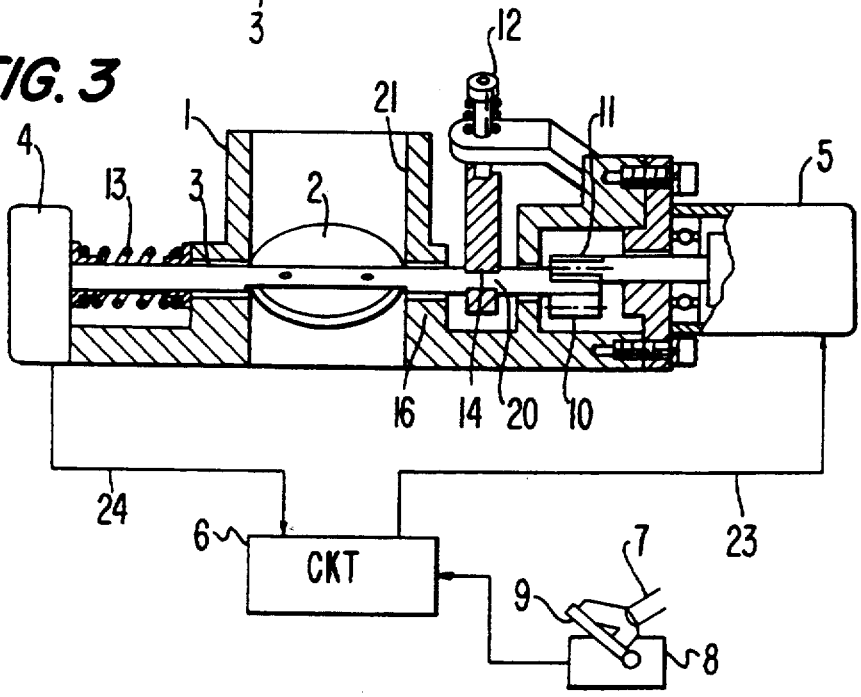
FIG. 3 is a partial cross sectional view of the throttle valve assembly of another embodiment according to the present invention, showing the stopper installed outside the throttle valve assembly.

To reduce wear of the adjusting screw [,] 12 and the restricting member 14, their surfaces may be hardened as by quenching. If operation of this mechanism produces no abrasive particles from wear, the stopper assembly may be installed inside the throttle valve assembly, as shown in FIG. 1. If worn particles are produced from the contacting action of the restricting member and screw, the stopper assembly may be installed outside the throttle valve assembly as shown in FIG. 3 since the abrasive particles would adversely affect the operation of the gear mechanism 10. The stepping motor may be replaced by a DC motor, which has an inertia, without losing the effect of the invention.

Figure 2:
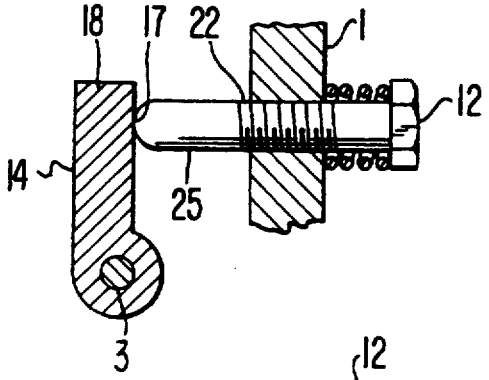
FIG. 2 is a partial enlarged view of FIG. 1, showing the stopper and an adjusting screw.

Since the shank 25 of the adjusting screw 12 shown in FIG. 2 has threads 22 by which the screw 12 when turned moves back and forth through the housing 1 of the throttle valve assembly, the restricting plate can be positioned with high accuracy.

What we claim is:

1. In a motor-driven throttle valve assembly in which a motor controls the opening of the throttle valve which rotates inside a throttle valve assembly housing according to a signal representing the amount of depression of an accelerator pedal and rotation of the motor is transmitted to a shaft of the throttle valve through a gear mechanism installed between [the] *an* output shaft of the motor and the throttle valve shaft, wherein the improvement comprises a stopper disposed in *a gear mechanism housing formed as a one-piece unitary body with* the throttle valve assembly housing [with the motor] and mounted on a part of the throttle valve shaft *extending from* the motor side [and the gear mechanism] *of the throttle valve*, said stopper being *separate from said gear mechanism and* operative to *mechanically* keep the gap between the throttle valve and an air horn wall of the throttle valve assembly housing within a specified value when the throttle valve is near a fully closed position.

2. A motor-driven throttle valve assembly as set forth in claim 1, wherein the stopper is secured to the throttle valve shaft so that its rotates with the shaft, and the stopper has an adjusting screw with a projecting part adapted to abut against the radially outward portion of the stopper to restrict the rotation of the throttle valve toward the closed position so that the throttle valve stops in a specified position.

3. A motor-driven throttle valve assembly as set forth in claim 2, wherein the projecting part of the adjusting screw has threads by which the screw when turned is moved forward and backward through the throttle valve assembly housing.

*4. A motor-driven throttle valve assembly, comprising:*

*(a) a throttle valve assembly housing having an air intake passage therein;*

*(b) a throttle shaft passing through the air intake passage and being rotatably supported on said throttle valve assembly housing;*

*(c) a throttle valve fixed to said throttle shaft and adapted to adjust an air quantity flowing through the air intake passage;*

*(d) a motor for driving said throttle shaft in opening and closing directions of the throttle valve movement;*

*(e) a gear mechanism, enclosed in a housing formed as a one-piece unitary body with said throttle valve assembly housing, for transmitting torque produced by said motor to said throttle shaft; and*

*(f) a stopper mechanism, composed of a restriction member, separate from said gear mechanism and moving together with the throttle valve movement, and a stopper provided on a part of the gear mechanism housing, which is operatively associated with the restriction member in order to mechanically hold said throttle valve at a specified open position when said throttle valve is closed.*

*5. A motor-driven throttle valve assembly as set forth in claim 4, wherein the restriction member is provided on a part of said throttle shaft.*

*6. A motor-driven throttle valve assembly as set forth in claim 5, wherein the restriction member is provided on said throttle shaft at the side of said throttle valve where said motor is located.*

*7. A motor-driven throttle valve assembly as set forth in claim 6, wherein the restriction member is a restriction plate which is fixed to said throttle shaft at the side of said throttle valve where said motor is located.*

*8. A motor-driven throttle valve assembly as set forth in claim 7, wherein the stopper is an adjustable screw driven into the gear mechanism housing, which is in operative association with the restriction plate, so that the specified open position is established by adjusting the adjustable screw.*

*9. A motor-driven throttle valve assembly, comprising:*

*(a) a throttle valve assembly housing having an air intake passage therein;*

*(b) a throttle shaft passing through the air intake passage and being rotatably supported on said throttle valve assembly housing;*

*(c) a throttle valve fixed to said throttle shaft and adapted to adjust an air quantity flowing through the air intake passage;*

*(d) a motor coupled to one end of said throttle shaft through a gear mechanism which is enclosed in a housing formed as a one-piece unitary body with said throttle valve assembly housing and is adapted to drive said throttle shaft;*

*(e) a return spring coupled to the other end of said throttle shaft for rotating said throttle shaft toward the closing direction of said throttle valve; and*

*(f) a stopper mechanism, composed of a restricting member, separate from said gear mechanism and moving with movement of said throttle shaft and a stopper provided on a part of the gear mechanism housing, which is operatively associated with the restricting member, for mechanically holding said throttle valve at a specified open position when said throttle valve is closed so as to prevent said throttle valve from sticking in the closed position.*

*10. A motor-driven throttle assembly as set forth in claim 9, wherein the restricting member is provided at the side of said throttle valve where said motor is located.*

*11. A motor-driven throttle assembly as set forth in claim 10, wherein the specified open position is adjusted by adjusting the stopper.*

*12. A motor-driven throttle assembly as set forth in claim 11, wherein the stopper is an adjustable screw driven into the gear mechanism housing and the restricting member is a restriction plate provided on a part of said throttle shaft.*

*13. A motor-driven throttle valve assembly, comprising:*

*(a) a throttle valve assembly housing having an air intake passage therein;*

*(b) a throttle shaft passing through the air intake passage and being rotatably supported on said throttle valve assembly housing;*

*(c) a throttle valve fixed to said throttle shaft and adapted to adjust an air quantity flowing through the air intake passage;*

*(d) a motor, coupled to said throttle shaft through a gear mechanism, which is enclosed in a housing formed as a one-piece unitary body with said throttle valve assembly housing, for driving said throttle shaft;*

*(e) a stopper mechanism, having a restricting member, separate from said gear mechanism and moving together with movement of said throttle shaft, and a stopper provided on a part of the gear mechanism housing, which is operatively associated with the re-*

*stricting member, for mechanically restricting movement of said throttle shaft to hold said throttle valve at a specified open position when said throttle valve is closed;*

*(f) a control circuit connected to said motor;*

*(g) accelerator manipulated variable detection means for detecting accelerator manipulated variables by a driver; and*

*(h) means for applying an output of said accelerator manipulated variable detection means to said control circuit.*

*14. A motor-driven throttle assembly as set forth in claim 13, further including throttle valve opening degree detection means for detecting opening degrees of said throttle valve and for applying valve position signals to said control circuit.*

*15. A motor-driven throttle assembly as set forth in claim 14, wherein said control circuit includes means for checking the opening degree of said throttle valve.*

*16. A motor-driven throttle assembly as set forth in claim 15, wherein said motor is a DC motor.*

*17. A motor-driven throttle assembly as set forth in claim 15, wherein said motor is a pulse motor.*

*18. A motor-driven throttle valve assembly, comprising:*

*(a) a throttle valve assembly housing having an air intake passage therein;*

*(b) a throttle shaft passing through the air intake passage and being rotatably supported on said throttle valve assembly housing;*

*(c) a throttle valve fixed to said throttle shaft and adapted to adjust an air quantity flowing through the air intake passage;*

*(d) a motor housing fixed to said throttle valve assembly housing;*

*(e) a motor fixed and held on said motor housing;*

*(f) a motor shaft passing through said motor housing and extending to said throttle valve assembly housing;*

*(g) a gear mechanism coupling said throttle shaft and said motor shaft between said throttle valve assembly housing and said motor housing, and which is enclosed by a gear mechanism housing, said throttle valve assembly housing and said gear mechanism housing being formed integrally as a one-piece unitary body; and*

*(h) a stopper mechanism, composed of a restricting member, separate from said gear mechanism and moving together with movement of said throttle shaft, and a stopper provided on a part of the gear mechanism housing, which is operatively associated with the restricting member for mechanically holding said throttle valve at a specified open position when said throttle valve is closed.*

*19. A motor-driven throttle assembly as set forth in claim 18, wherein said stopper mechanism has a structure, in which the specified open position is adapted to be adjustable.*

*20. A motor-driven throttle assembly as set forth in claim 19, wherein the stopper is an adjustable screw driven into the gear mechanism housing and the restricting member is a restriction plate provided on a part of said throttle shaft.*

*21. A motor-driven throttle valve assembly, comprising:*

*(a) a throttle valve assembly housing having an air intake passage therein;*

*(b) a throttle shaft passing through the air intake passage and being rotatably supported on said throttle valve assembly housing;*

*(c) a throttle valve fixed to said throttle shaft and adapted to adjust an air quantity flowing through the air intake passage;*

*(d) a motor coupled to one end of said throttle shaft through a gear mechanism, which is enclosed in a housing formed as a one-piece unitary body with said throttle valve assembly housing, for driving said throttle shaft;*

*(e) a return spring coupled to the other end of said throttle shaft for rotating said throttle shaft toward the closing direction of said throttle valve;*

*(f) a stopper mechanism, having a restricting member, separate from said gear mechanism and moving together with movement of said throttle shaft, and a stopper provided on a part of the gear mechanism housing, which is operatively associated with the restricting member, for mechanically holding said throttle valve at a specified open position when said throttle valve is closed;*

*(g) a control circuit connected to said motor;*

*(h) accelerator manipulator variable detection means for detecting accelerator manipulated variables by a driver; and*

*(i) means for applying an output of said accelerator manipulated variable detection means to said control circuit.*

*22. A motor-driven throttle valve assembly, comprising:*

*(a) a throttle valve assembly housing having an air intake passage therein;*

*(b) a throttle shaft passing through the air intake passage and being rotatably supported on said throttle valve assembly housing;*

*(c) a throttle valve fixed to said throttle shaft and adapted to adjust an air quantity flowing through the air intake passage;*

*(d) a motor housing fixed to said throttle valve assembly housing;*

*(e) a motor fixed and held on said motor housing;*

*(f) a motor shaft passing through said motor housing and extending to said throttle valve assembly housing;*

*(g) a gear mechanism housing formed as a one-piece unitary body with said throttle valve assembly housing;*

*(h) a gear mechanism, enclosed in said gear mechanism housing, for coupling one end of said throttle shaft and said motor shaft;*

*(i) a return spring coupled to the other end of the throttle shaft on a side opposite to said motor for rotating said throttle shaft toward the closing direction of said throttle valve; and*

*(j) a stopper mechanism, for mechanically holding said throttle valve at a specified open position when said throttle valve is closed, including an adjustable screw driven into a part of gear mechanism housing and a restriction plate, separate from said gear mechanism and provided on a part of said throttle shaft, so that the specified open position is adjustable.*

*23. A motor-driven throttle valve assembly, comprising:*

*(a) a throttle valve assembly housing having an air intake passage therein;*

*(b) a throttle valve, rotatably supported on said throttle valve assembly housing, for adjusting an air quantity flowing through the air intake passage;*

*(c) a motor for rotating said throttle valve through a gear mechanism, which is enclosed in a housing formed as one-piece unitary body with said throttle valve assembly housing in opening and closing directions of throttle valve movement and*

(d) a restricting device, composed of a restricting member, separate for said gear mechanism and moving together with the throttle valve movement and a stopper provided on a part of the gear mechanism housing, which is operatively associated with the restricting member, for mechanically restricting the rotating scope of said throttle valve to hold said throttle valve at a specified open position when said throttle valve is closed.

24. A motor-driven throttle valve assembly as set forth in claim 23, wherein the restricting member is disposed on the same side of said motor with respect to said throttle valve.

25. A motor-driven throttle valve assembly as set forth in claim 23, wherein the restricting member is provided on the same side of said motor with respect to said throttle valve, and the stopper is an adjustable screw driven into the gear mechanism housing, so that the specified open position is established by contact of the restricting member with the adjustable screw.

26. A motor-driven throttle valve assembly, comprising:

(a) a throttle valve assembly housing having an air intake passage therein;

(b) a throttle valve, rotatably supported on said throttle valve assembly housing, for adjusting an air quantity flowing through the air intake passage;

(c) a motor provided on one side of said throttle valve to rotate said throttle valve through a gear mechanism, which is enclosed in a housing formed as one-piece unitary body with said throttle valve assembly housing;

(d) a return spring provided on the other side of said throttle valve for rotating said throttle valve toward the closing direction thereof; and (e) a restricting device having a restricting member, separate from said gear mechanism and moving together with movement of said throttle shaft and a stopper provided on a part of the gear mechanism housing, which is operatively associated with the restricting member, for mechanically restricting the rotating scope of said throttle valve so as to hold said throttle valve at a specified open position when said throttle valve is closed, whereby said throttle valve is prevented from sticking in the closed position.

27. A motor-driven throttle valve assembly as set forth in claim 26, wherein the restricting member is disposed on the same side of said motor with respect to said throttle valve.

28. A motor-driven throttle valve assembly as set forth in claim 27, wherein the specified open position is adjusted by adjusting the stopper.

29. A motor-driven throttle valve assembly as set forth in claim 28, wherein the stopper is an adjustable screw driven into the gear mechanism housing, so that the specified open position is established by adjusting contact of the restricting member with the adjustable screw.

30. A motor-driven throttle valve assembly, comprising:

(a) a throttle valve assembly housing having an air intake passage therein;

(b) a throttle valve adapted to adjust an air quantity flowing through the air intake passage, a shaft of which is rotatably supported on said throttle valve assembly housing;

(c) a motor for rotating the throttle valve shaft through a gear mechanism, which is enclosed in a housing formed as one-piece unitary body with said throttle valve assembly housing;

(d) a restricting device having a restricting member, separate from said gear mechanism and moving together with movement of said throttle shaft, and a stopper provided on a part of the gear mechanism housing, which is operatively associated with the restricting member, for mechanically restricting the rotating scope of said throttle shaft, whereby said throttle valve is held at a specified open position when said throttle valve is closed;

(e) a control circuit connected to said motor for controlling said motor;

(f) accelerator manipulated variable detection means for detecting accelerator manipulated variables by a driver; and (g) means for applying an output of said accelerator manipulated variable detection means to said control circuit.

31. A motor-driven throttle valve assembly as set forth in claim 30, further including throttle valve opening degree detection means for detecting opening degrees of said throttle valve and for applying valve position signals to said control circuit.

32. A motor-driven throttle valve assembly as set forth in claim 31, wherein said control circuit includes means for checking opening degree ratios of said throttle valve.

33. A motor-driven throttle valve assembly, comprising:

(a) a throttle valve assembly housing having an air intake passage therein;

(b) a throttle valve adapted to adjust an air quantity flowing through the air intake passage, a shaft of which is rotatably supported on said throttle valve assembly housing;

(c) a motor housing fixed to said throttle valve assembly housing;

(d) a motor fixed and held on said motor housing, a shaft of which passes through said motor housing and extends to said throttle valve assembly housing;

(e) a gear mechanism coupling the throttle valve shaft and the motor shaft between said throttle valve assembly housing and said motor housing, which is enclosed in a housing formed as a one-piece unitary body with said throttle valve assembly housing; and (f) a restricting device in the form of an exclusively mechanical stop device separate from said gear mechanism and provided on a part of the gear mechanism housing, for mechanically restricting the rotating scope of the throttle valve shaft to hold said throttle valve at a specified open position when said throttle valve is closed.

34. A motor-driven throttle valve assembly as set forth in claim 33, wherein said restricting means has a structure, in which the specified open position is adapted to be adjustable.

35. A motor-driven throttle valve assembly as set forth in claim 34, wherein said restricting means adapted to adjust the specified open position is a combination structure of an adjustable screw driven into the gear mechanism housing with a restriction member provided so as to rotate together with the rotation of said throttle valve.

36. A motor-driven throttle valve assembly, comprising:

(a) a throttle valve assembly housing having an air intake passage therein;

(b) a throttle valve adapted to adjust an air quantity flowing through the air intake passage, a shaft of which is rotatably supported on said throttle valve assembly housing;

(c) a motor, coupled to one end of the throttle valve shaft through a gear mechanism, which is enclosed in a housing formed as one-piece unitary body with said throttle valve assembly housing, for rotating said throttle valve;

*(d) a return spring coupled to the other end of the throttle valve shaft for rotating the throttle valve shaft toward the closing direction of said throttle valve;*

*(e) a restricting device, separate from said gear mechanism and provided on a part of the gear mechanism housing, for mechanically restricting the rotating scope of the throttle valve shaft to hold said throttle valve at a specified open position when said throttle valve is closed;*

*(f) a control circuit connected to said motor;*

*(g) accelerator manipulated variable detection means for detecting accelerator manipulated variables by a driver; and*

*(h) means for applying an output of said accelerator manipulated variable detection means to said control circuit.*

*37. A motor-driven throttle valve assembly, comprising:*

*(a) a throttle valve assembly housing having an air intake passage therein;*

*(b) a throttle valve adapted to adjust an air quantity flowing through the air intake passage, a shaft of which is rotatably supported on said throttle valve assembly housing;*

*(c) a motor housing fixed to said throttle valve assembly housing;*

*(d) a motor fixed and held on said motor housing, a shaft of which passes through said motor housing and extends to said throttle valve assembly housing;*

*(e) a gear mechanism coupling one end of said the throttle valve shaft and said motor shaft between said throttle valve assembly housing and said motor housing, which is enclosed in a housing formed as a one-piece unitary body with of said throttle valve assembly housing;*

*(f) a return spring coupled to the other end of the throttle valve shaft on the opposite side to said motor for rotating the throttle valve shaft toward the closing direction of said throttle valve; and*

*(g) a restricting device for mechanically restricting the rotating scope of the throttle valve shaft to hold said throttle valve at a specified open position when said throttle valve is closed, including an adjustable screw driven into a part of the gear mechanism housing and a restricting member, separate from said gear mechanism and adapted to rotate together with the rotation of said throttle valve, so that the specified open position is adjustable.*

* * * * *